Figure 1:
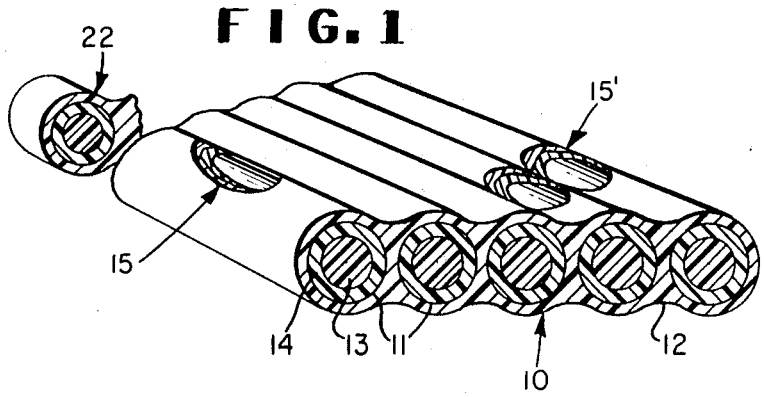
Figure 2:
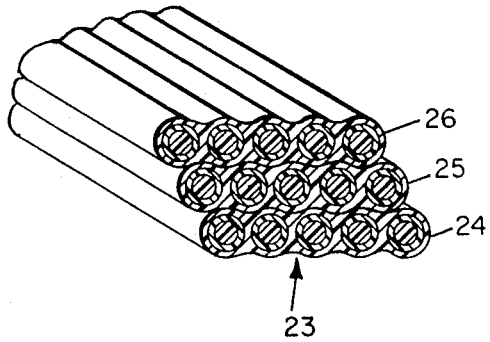
Figure 3:
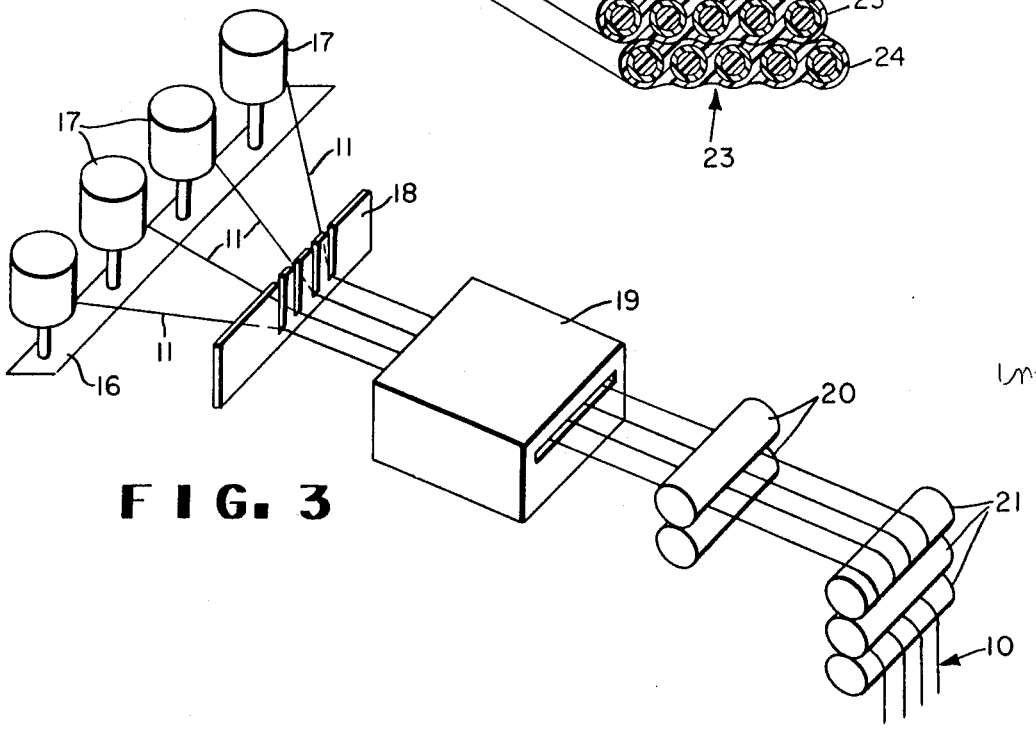

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 18, 1972

900 O.G. 816

T900,002
OPTICAL FIBER RIBBON AND METHOD OF MANUFACTURE

Jack Barnett Wielar II, Wilmington, Del., assignor to E. I. du Pont de Nemours and Company, Wilmington, Del.

Filed Feb. 8, 1971, Ser. No. 113,563
Int. Cl. G02b *5/16*
U.S. Cl. 350—96 B
1 Sheet Drawing. 10 Pages Specification

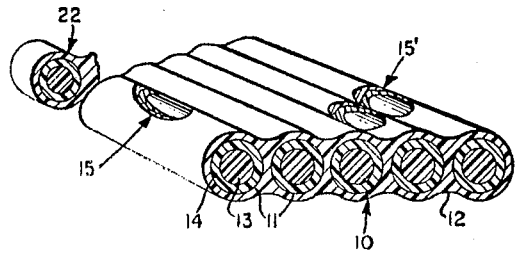

Optical fiber ribbons of unitary and substantially planar construction are provided wherein a plurality of polymeric optical filaments are aligned and adhesively secured in side-to-side relationship to provide a non-woven ribbon which may be frustrated at any desired or selected location along its length to provide light emission thereat of any light adapted to be transmitted by said optical filaments of said ribbon.

An especially useful construction employing the optical ribbon comprises several layers of the non-woven fiber ribbon secured together by any suitable means such as adhesives to provide a unitary image guide structure. The layers of the image guide need not be secured together along the entire length thereof, but can be secured together at only the respective ends of the image guide. In all instances, however, each optical ribbon layer of the image guide must be similarly aligned at each end of the image guide in order to properly transmit an image from one end of the image guide to the other.

350-96.24 348 SR T

OR T 900,002

July 18, T900,002

OPTICAL FIBER RIBBON AND METHOD OF MANUFACTURE

Filed Feb. 8, 1971

6T

Image bundle

INVENTOR

JACK BARNETT WIELAR II

BY Claude L. Beaudoin

ATTORNEY